United States Patent [19]

Morris et al.

[11] 4,403,253

[45] Sep. 6, 1983

[54] UNIFORM DISTRIBUTION VIDEO PROCESSOR WITH CONTROLLED REFERENCE VOLTAGES

[75] Inventors: Edwin E. Morris, Clinton; Richard L. Kies, Chadwicks, both of N.Y.

[73] Assignee: General Electric Company, Utica, N.Y.

[21] Appl. No.: 335,013

[22] Filed: Dec. 28, 1981

[51] Int. Cl.³ .............................................. H04N 5/14
[52] U.S. Cl. .................................... 358/160; 358/169; 358/166
[58] Field of Search ................. 358/111, 113, 54, 160, 358/164, 168, 169; 307/361; 328/143, 147

[56] References Cited

U.S. PATENT DOCUMENTS

| | | | |
|---|---|---|---|
| 3,979,555 | 9/1976 | Opittok et al. | 358/160 |
| 3,983,320 | 9/1976 | Ketcham et al. | 358/166 |
| 3,999,047 | 12/1976 | Green | 382/54 |
| 4,268,363 | 5/1981 | Los | 358/160 |
| 4,353,092 | 10/1982 | Bailey et al. | 358/160 |

Primary Examiner—John C. Martin

Attorney, Agent, or Firm—Stephen A. Young

[57] ABSTRACT

A video processor that provides non-linear amplification of an input video signal by automatically modulating a non-linear transfer function of an amplifier having a plurality of piece-wise, analog-to-digital (A/D) converter sections. Each A/D converter has both high and low reference levels set at the input break points of the non-linear transfer function to assign an equal number of shades or levels of gray thereto. The high and low reference levels are connected in a "totem pole" configuration with the high reference level of the first converter providing the low reference level to the second converter, and so on for the remaining converters. Each of a plurality of reference control generators continuously adjusts the reference levels applied to an associated A/D converter by comparing the output video signal with a pre-determined reference voltage to nearly uniformly distribute each level of gray in accordance with the percentage of time various levels of the output video signal are detected, to thereby enhance the perception of visual information.

8 Claims, 5 Drawing Figures

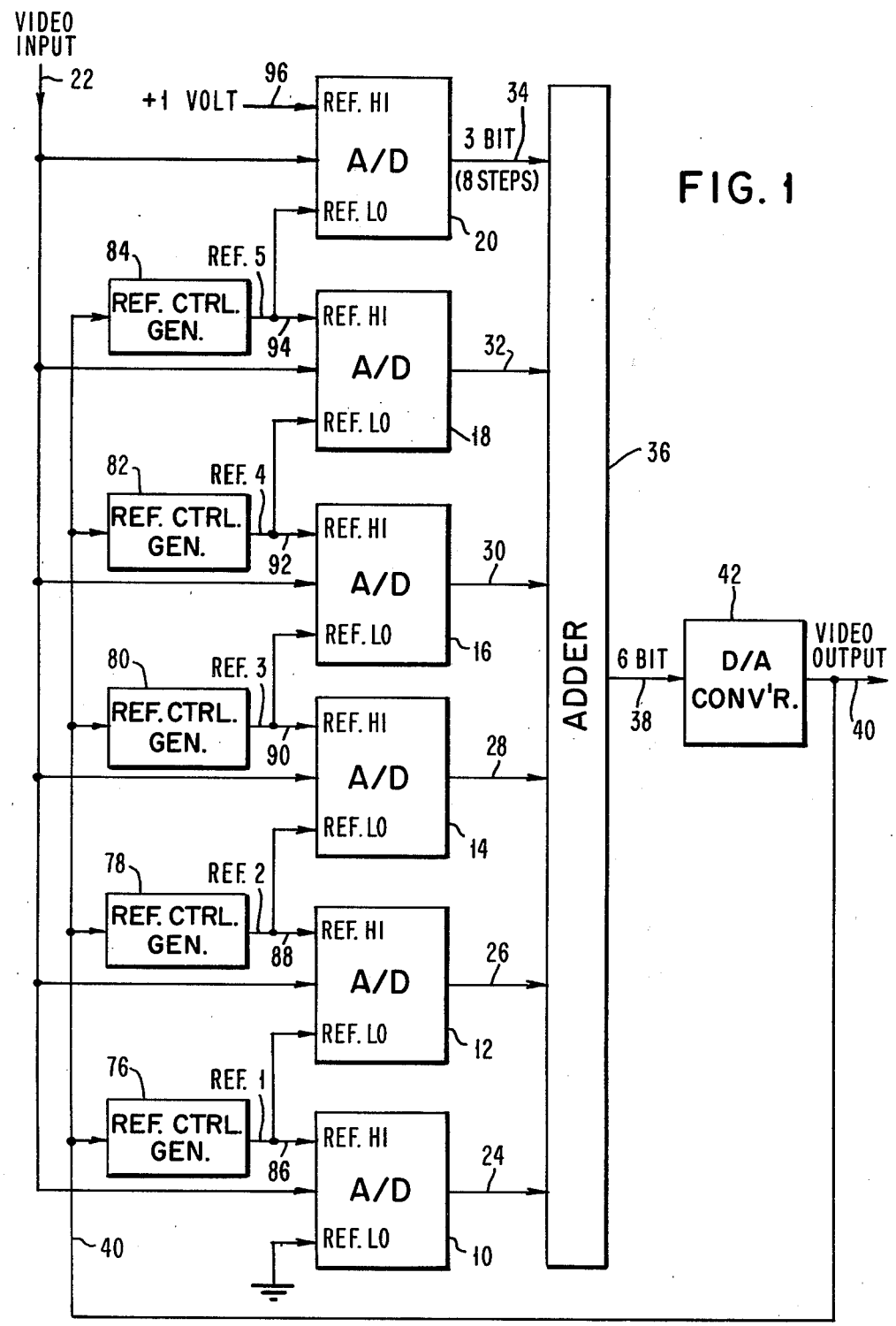

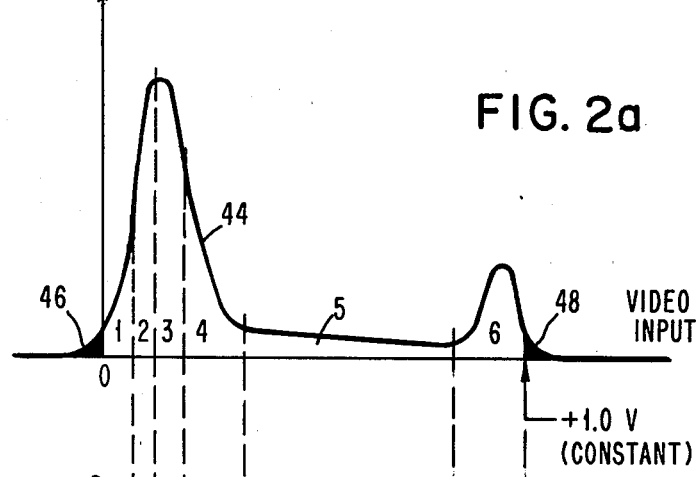
FIG. 2a
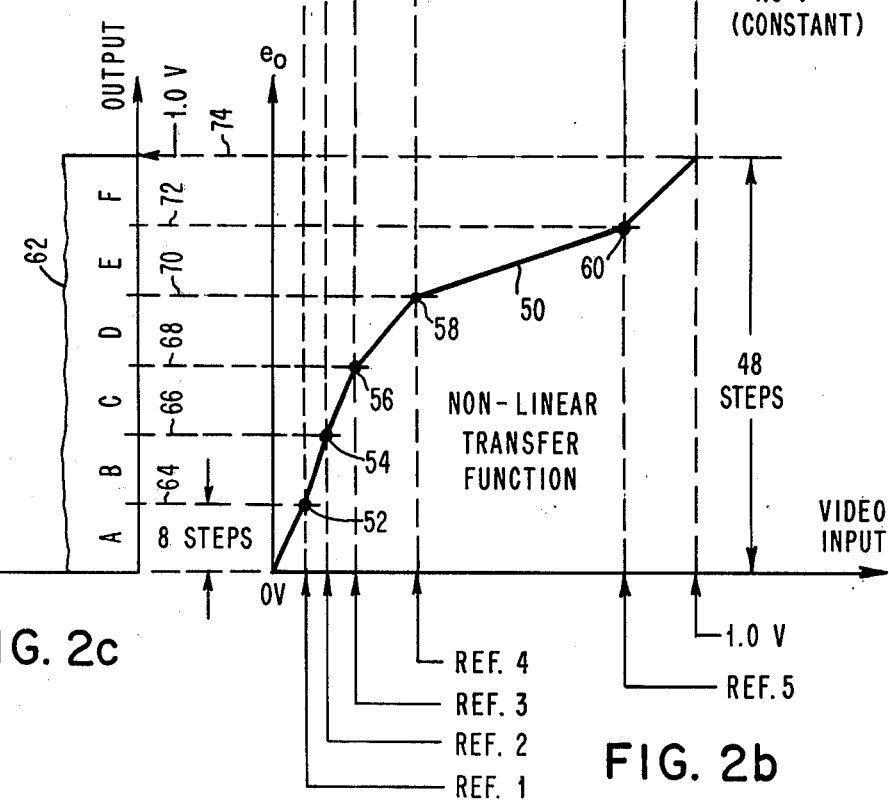
FIG. 2c
FIG. 2b

REFERENCE CONTROL GENERATOR 84

UNIFORM DISTRIBUTION VIDEO PROCESSOR WITH CONTROLLED REFERENCE VOLTAGES

BACKGROUND OF THE INVENTION

1. Field of the Invention

The present invention relates to the processing of video signals, and more particularly to the processing of video signals representing many levels or shades of gray in a black and white picture.

2. Description of the Prior Art

The typical black and white picture is made up of 48 perceivable shades of gray covering the full dynamic range of what the eye normally sees. In a primarily dark scene with some light area included, there are not enough contrasts of this mainly dark scene to provide sufficient contrast to make the detail visible to the normal eye. In such a scene, too many levels or shades of gray will be allocated to the light shades even though they do not occur very often. In known prior art video processing systems, it is common to take a received video signal and stretch it over a full dynamic range of 48 levels, or shades, to enhance the contrast of the signal, regardless of how many levels of shade the signal actually possesses. This enables objects to be visually detected on a television monitor that previously could not be seen. Such prior art systems were effective for enhancing the contrast between a signal that is either very dark or very light and, thereby not having much contrast. However, where there exists a signal having dark shades, very little moderate shades and some light shades, the known systems provide very little contrast enhancement due to the inordinate amount of time devoted to the enhancement of the signal where there is a small amount of moderate shade. Where such types of signals are being processed, there is a minimum amount of contrast enhancement because there is no discrimination between signals that occur more often as compared with the signals or shades that rarely occur. Also, in such systems, each of the shades of the input signals is allocated the same number of shades of gray as the output. Therefore, the dark shades which have a low signal level but occur more often than the remaining levels of signals are actually not provided with any contrast enhancement.

OBJECTS OF THE INVENTION

Therefore, it is an object of the present invention to provide for enhancement of visual information so that each shade of gray on the output has an equal probability of occurrence. It is another object to provide a video processor with a uniform probability distribution function of the output shades of gray.

These and other objects of the invention will be pointed out hereinafter.

SUMMARY OF THE INVENTION

In accordance with the present invention there is provided a system and technique for processing video signals which are divided into a plurality of signal levels associated with a respective number of shades or levels of gray, and dividing the spectrum for the levels of shade into a number of sections containing a portion of such levels of shade, wherein the probability that the input video signal falls within the range of a given section is equal for each of the sections. The system enhances the perception of visual information by non-linear amplification of the video signal in such manner that each shade of gray on the output has an equal probability of occurrence. That is, the output video signal has a uniform probability distribution function where there is developed a level of distribution in accordance with how often the shades of gray occur. The video processor provides non-linear amplification of the video signal by an automatically modulated, non-linear transfer function of an amplifier having a plurality of piece-wise, analog-to-digital (A/D) converter sections. The A/D converter employed in each section has both high and low reference levels being set at the input break points in the non-linear transfer function. The high and low reference levels are connected in a "totem pole" configuration with high the reference level of the first section serving as the low reference level of the second section, and the high reference level of the second section serving as the low reference level of the third section, and so on for the remaining high and low reference levels and associated A/D converter sections. The input video signal is pre-stretched from the high reference level of the last A/D converter to the low reference level of the first A/D converter, such that each A/D converter will process a slice of the input video signal. Recognizing that the very highest and lowest reference levels are fixed, by adjusting the remaining reference levels, each slice can be made as wide or as narrow as required.

Each of a plurality of reference control generators continuously adjusts its respective alterable reference level applied to an associated A/D converter section. Each reference control generator compares the output video signal with a pre-determined reference voltage, which reference voltage defines the percentage of time that the output video signal will be assigned a particular number of levels of gray. In response to such comparison, the reference control generator output adjusts the reference level applied to its respective A/D converter. In this manner, each reference control generator functions as an error sensor in an independent feedback loop.

If the reference levels are adjusted so that each slice of the video signal is occupied an equal amount of time (time average), and if the outputs of the A/D converters are algebraically added, then the resulting output signal will have a nearly uniform probability distribution function.

In this fashion, the system divides the input probability distribution into a number of sections having equal areas, and provides individual reference control generators which control the reference or threshold levels so that the probability that the input falls within the range of high and low reference levels for a given section is equal for each section. The net result is to generate an output probability distribution function which is nearly uniformly distributed, and each shade of gray has an equal probability of occurrence.

It is to be understood that, as used herein, the terms "input probability distribution function" of a scene is intended to mean the related probability of occurrence of each shade or level of gray assigned to the input video signal. Similarly, it is to be understood that the term "uniform output probability distribution function" is intended to mean that the output video signal will be nearly uniformly distributed at each level of gray, and the areas in the distribution function curve are equal areas having equal width.

BRIEF DESCRIPTION OF THE DRAWINGS

FIG. 1 is a system block diagram of the video processor with a plurality of reference control generators connected to individual A/D converters for providing for non-linear amplification of video signals, illustrative of the present invention;

FIG. 2a is a graph of a typical input probability distribution function of a dark scene containing a bright light;

FIG. 2b shows the non-linear transfer function of the video output to video input where the output is broken into a given number of steps by each of a series of reference levels; and FIG. 2c shows a curve of the output probability distribution function which is nearly uniformly distributed.

DESCRIPTION OF THE PREFERRED EMBODIMENT

Figure 3:
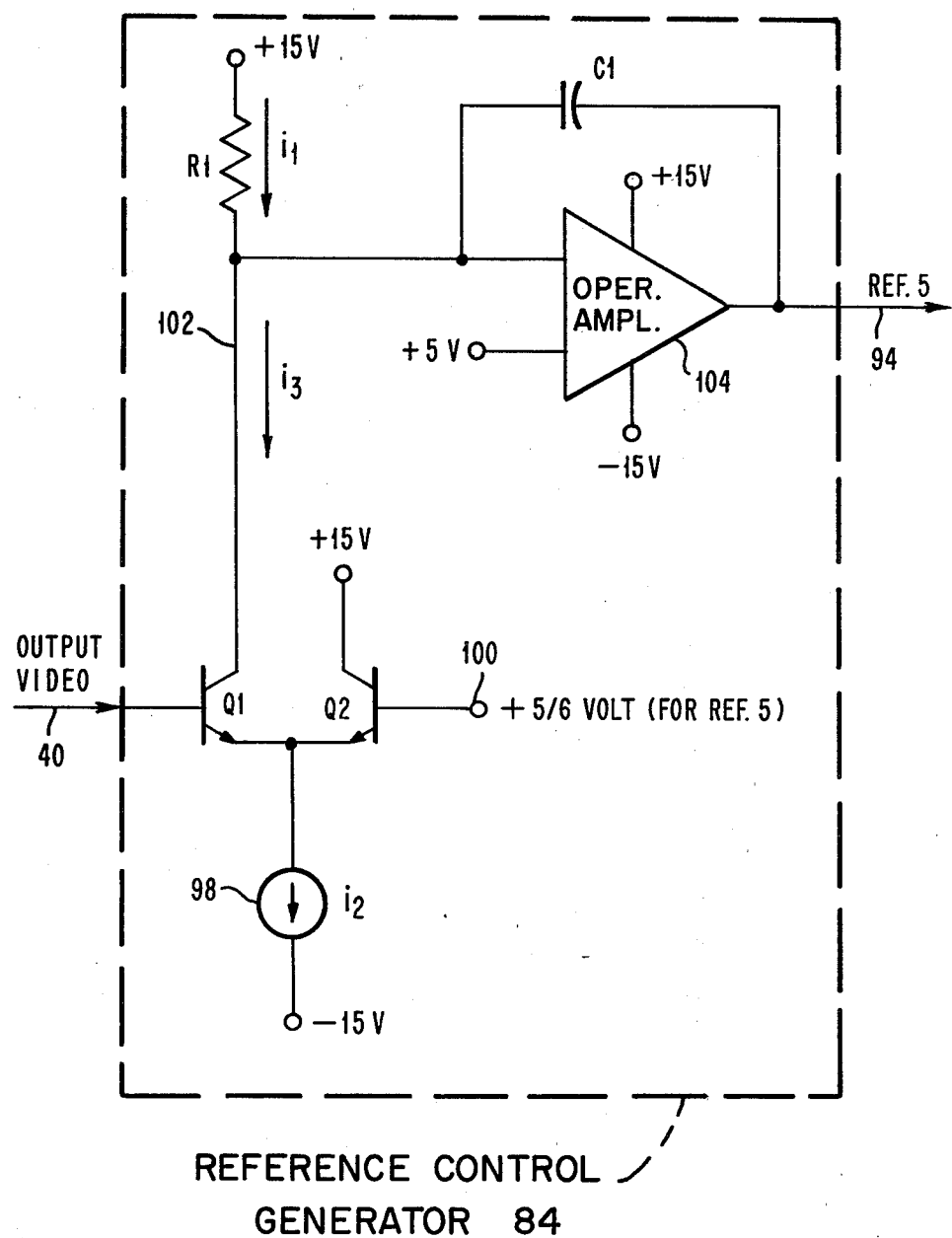
FIG. 3 is a circuit diagram of a reference control generator shown in the system diagram of FIG. 1.

FIG. 1 shows a block diagram of the video processing system which, by way of example, includes six, three bit A/D converters 10, 12, 14, 16, 18 and 20 connected in a "totem pole" configuration for receiving the video input on a line 22 and for dividing such video input into sections to provide a non-linear amplification as will be described. Six outputs 24, 26, 28, 30, 32 and 34 from respective A/D converters 10-20 are added together in an adder 36 to generate a total video output on a line 38. The addition can be accomplished by an eighteen-to-six bit digital encoding, by digital addition, or by adding together the analog outputs of six, three bit D/A converters. The net result in either case is that the output of the adder is divided into forty-eight equal steps with each A/D converter contributing eight steps. The final video output is provided on an output line 40 of a D/A converter 42, which converter is connected to adder 36 via line 38. The A/D converter, the adder and D/A converter serve as a form of amplifier means for the video processing system.

FIGS. 2a, 2b and 2c are graphs for facilitating understanding of the operation of the system. FIG. 2a represents a curve 44 which is a typical input probability distribution function of a scene containing some bright lights. The input video is stretched between black (0 volts) and white (1.0 volts) by conventional video recording means, not shown. The known system controls the bias level and the gain of the video so that the video exceeds the peak white 2% of the time and goes below the black level 2% of the time. This is indicated by the shaded ares 46 and 48 in FIG. 2a.

In accordance with the embodiment of the present invention to be described herein, the input probability distribution is divided into six sections, with each section having an equal area as indicated in areas 1-6 in FIG. 2a. The lines separating the six areas are represented by reference levels 1 through 5. These reference levels are the five reference control voltages shown in FIG. 1, as will be described in detail below.

Eight steps indicative of eight shades of gray and represented by 3 bits are established to divide an area between adjacent reference levels or voltages. An input signal varying from zero volts to Ref. 1 will cause the output to increase from zero to eight steps. If the input continues to increase from Ref. 1 to Ref. 2, the output will continue to increase to sixteen steps. Thus the amplifier means is shown to have a non-linear transfer function as illustrated by curve 50 shown in FIG. 2b, where the video input axis of both FIGS. 2a and 2b are equally graduated over a zero to 1.0 volt gradient with the five reference levels 1 through 5 being coincident with the lines separating the six equal areas. Transfer function as illustrated by curve 50 corresponds with the area under input probability distribution curve 44 determined by an integration process. By dividing the total output of 48 steps into 6 equal sections of 8 steps each, the Ref. 1-Ref. 5 lines, respectively cross the transfer function curve 50 at points 52, 54, 56, 58 and 60.

Next, the division of the input probability distribution will be described. The area under a given probability distribution function is equal to one. Therefore, if the input distribution is divided into equal areas, each area will be equal to 1/6. Given that the areas are equal, the probability that the input is less than Ref. 1 (a variable) is equal to 1/6, and as a result the probability that the output signal is less than 1/6 volt (steps) is also equal to 1/6. The threshold Ref. 1 is then automatically adjusted so that the output voltage is less than 1/6 volt for exactly 1/6 of the time. In a similar manner, Ref. 2 is controlled so that the output is less than 2/6 volt for 2/6 of the time. (Area 1 plus Area 2). A similar process continues for each of the thresholds, with each threshold controlled by an independent feedback control loop as will be described in detail with respect to FIG. 3 . . .

The net result of the process is to generate an output probability distribution function which is nearly uniformly distributed as shown by a function curve 62 in FIG. 2c, where the six areas A-F have both equal areas and also equal width as defined by the lines 64, 66, 68, 70, 72 and 74. In effect, each of the five reference levels is adjusted so that each eight step slice of the video signal has an equal probability of occurrence. Reference levels 1-5 are adjusted or modified by the system shown in FIG. 1 using individual reference control generators 76, 78, 80, 82 and 84 associated with each of the reference levels. The reference control generators function as error sensors in independent feedback loops by receiving the video output signal from line 40 to adjust the reference levels. The adjusted reference levels appearing on respective generator output lines 86, 88, 90, 92 and 94 are applied to respective A/D converters 10-12 to control their respective slice or section of the video input signal. In this fashion, the input video signal on line 22 is pre-stretched from the fixed high reference level, in this case 1.0 volts on line 96 into the last A/D converter 20, to the fixed low reference level, in this case ground level, into the first A/D converter 10. As shown in FIG. 1, the totem pole configuration of the high and low DC reference levels applied to the A/D converters provide that the high reference level applied to the first section, i.e. A/D converter 10, also serves as the low reference level applied to the second section, i.e. A/D converter 12 and so on, as shown by connecting lines 86-94.

Reference control generator 84, shown in circuit detail in FIG. 3, for controlling Ref. 5 will be described by way of example, but is also applicable to the other reference control generators and reference levels. This reference control generator determines the area F in FIG. 2c, i.e., the percentage of time that the output video signal exceeds approximately 5/6 of 1 volt.

The video output signal on line 40 is coupled to a reference comparator comprised of NPN transistors Q1 and Q2. The transistors are connected in a high gain differential amplifier configuration. The sum of the currents in the emitters of transistors Q1 and Q2 is $i_2$ and is constant, as determined by a constant current source 98. The reference voltage (5/6 volts) applied on line 100 is connected to the base of transistor Q2 and the output video signal on line 40 is connected to the base of transistor Q1. If the output video signal on line 40 is slightly less than 5/6 volts, then the current $i_2$ will pass through transistor Q2. However, if the output video signal is slightly greater than 5/6 volts, the current will pass through transistor Q1. If Q1 and Q2 are high beta transistors, almost all of the emitter current will flow through their respective collectors. The collector of transistor Q1 is connected via a conductor 102 to a resistor R1 and the negative input of a high gain, high input impedance operational amplifier 104 which operational amplifier is connected to function as an integrator. Plus and minus 15 volt D.C. voltages are applied to the various circuit elements as shown in FIG. 3.

For the purpose of explaining the operation of reference control generator 84, it will be assumed that operational amplifier 104 is operating in its linear range. This means that the voltage applied to the negative input is equal to the +5 volt positive input. This also means that the current ($i_1$) passing through resistor R1 will be constant and equal to (15−5) volts/R1 = 10 Volts/R1. Since operational amplifier 104 has a very high input impedance, and since there can be no DC current passing through its feedback capacitor C1, current $i_1$ will represent the DC component of the current $i_3$. The AC component of current $i_3$ will pass through capacitor C1 and through the low output impedance of operational amplifier 104. If C1 is sufficiently large, the AC component of the current will have only a small impact on the operational amplifier output voltage. The DC component of current $i_3$ is thus equal to current $i_2$ multiplied by the percentage of time that transistor Q1 is conducting. This is tantamount to the percentage of time that the output video signal exceeds 5/6 volt.

Now, it is assumed that the value of resistor R1 is chosen so that $i_1 = 1/6 \times (i_2)$ at the quiescent state of operational amplifier 104 and the operational amplifier output is connected to Ref. 5 on line 94. If the video signal were to change, causing Q1 to start conducting for a higher percentage of time, then the average value of the voltage at the negative input to the operational amplifier 104 would decrease, causing the Ref. 5 reference level to increase, thus appropriately reducing the percentage conduction time.

Similarly, reference control generator 82 controls Ref. 4. However, the reference voltage applied to the base of transistor Q2 would be 4/6 volt, and resistor R1 would be selected to limit the fraction of time that Q1 conducts to 2/6. In a similar manner, the threshold voltage and the resistor values are chosen for each of the remaining reference control generators 76, 78 and 80.

It is to be understood that while the system description has assumed a uniform probability distribution function, other forms of distribution can be generated by using a different selection of resistor R1 values.

While the invention has been described above with respect to its preferred embodiments, it should be understood that other forms and embodiments may be made without departing from the spirit and scope of the invention.

What is claimed is:

1. A system for processing input video signals representing a plurality of levels or shades of gray over a spectrum ranging from black to white, comprising:

amplifier means for receiving the input video signals, said amplifier means comprising a number of sections each of which is assigned to operate in the range of voltage levels representing shades of gray, each said amplifier section including an analog-to-digital A/D converter having an input range defined by a high reference level and a low reference level defining the input break points for each corresponding non-linear transfer function of said amplifier means, said A/D converters having their high and low reference levels connected in a totem pole configuration with the high reference level of a first of said sections providing the low reference level of a second of said sections, and so on; and a plurality of reference control generators associated individually with each of said A/D converters for continuously adjusting each of those of the reference levels which are applied to each of adjacent converters to pre-stretch the input video signal from the high reference level applied to the last A/D converter to the low reference level applied to the first A/D converter, each of said reference control generators comprising:

means for comparing the video output signal of said system with a pre-determined reference voltage defining the output range of occurrence of the shades of gray assigned to a given one of said A/D converters; and means responsive to said comparing means for adjusting that one of the reference levels assigned to a respective one of said A/D converters, whereby to provide for uniform distribution of shades of gray to the input video signals in accordance with their probability of occurrence.

2. A system as recited in claim 1, wherein said means for comparing the video output signal with the predetermined reference voltage comprises a differential amplifier including a pair of transistors with the first transistor having its base connected to the video output signal and the second transistor having its base connected to the pre-determined reference voltage, and a constant current source connected to the emitters of each of said transistors, whereby when the video output signal exceeds the predetermined reference voltage, an output current will pass through the collector of said first transistor causing an adjustment in the corresponding reference level generated from the output of said reference control generator and applied to its respective A/D converter.

3. A system as recited in claim 2, wherein said reference control generator is further comprised of an operational amplifier having its input connected to the collector of said first transistor, and a resistor connected to the collector of said first transistor, said resistor having a resistance value selected to control the percentage of time that said first transistor is in the conductive state.

4. A system as recited in claim 1, wherein a first of said A/D converters has its low reference level input connected to circuit ground and its high reference level input connected to receive an adjustable reference level voltage from a first of said reference control generators, a last of said A/D converters having its high reference level input connected to a fixed maximum DC voltage and its low reference level input voltage connected to receive an adjustable reference voltage from the last of said reference control generators.

5. A system as recited in claim 1, wherein said amplifier means further includes a digital adder connected to receive the outputs of each of said A/D converters, and a D/A converter connected to receive the output of said digital adder, whereby to provide a video output as an analog signal covering the entire gray scale spectrum.

6. A system for processing input video signals representing a plurality of levels or shades of gray, comprising:

amplifier means having a non-linear transfer function for receiving the input video signals and converting them to output video signals, said amplifier means including a number of individual amplifier sections each operating between consecutive sets of input voltage ranges spread across the entire voltage range of said input video signals, each set being defined by a number of levels of gray in accordance with the amount of their occurrence; and means for continuously adjusting a plurality of voltage reference levels each of which is applied to adjacent sets of amplifier sections in response to the output video signals such that each of said amplifier sections is responsive to the input video signals for a predetermined proportion of overall time, whereby to provide an equal distribution of shades of gray to the output video signal in accordance with the probability of occurrence of said shades of gray associated with the input video signals.

7. A system as recited in claim 6, wherein each of said adjusting means includes means for continuously comparing the output video signals with a predetermined fixed reference voltage assigned to that section, and for modifying the reference level assigned to that amplifier section in response to said comparing means.

8. A system for processing input video signals which are divided into a predetermined number of levels or shades of gray, comprising:

amplifier means including a number of individual sections operating between a range of voltages for dividing the input video signals into said number of sections, each section being defined by a number of levels of gray in accordance with the amount of their occurrence and having an input range determined by a high reference level and a low reference level defining the input break points of a transfer function for that section, said amplifier sections connected with their high and low reference levels in a totem pole configuration with the high reference level of a first of said sections providing the low reference level of a second of said sections and so on over the input voltage range; and a plurality of reference control generators for continuously adjusting each of those of said reference levels which are applied to each of adjacent amplifier sections, each reference control generator comprising:

means for comparing the video output signal with a predetermined fixed reference voltage that defines the output range of occurrence of the shades of gray assigned to a given amplifier section; and means responsive to said comparing means for adjusting one of said reference levels, whereby to uniformly distribute and assign each of the shades of gray to those levels of input video signals in accordance with their probability of occurrence, thereby enhancing the perception of visual information.

* * * * *